United States Patent [19]
Girard

[11] 3,986,686
[45] Oct. 19, 1976

[54] AIRCRAFT WITH RETRACTABLE ROTOR WING

[75] Inventor: Peter F. Girard, La Mesa, Calif.

[73] Assignee: Teledyne Ryan Aeronautical a Division of Teledyne Industries, Inc., San Diego, Calif.

[22] Filed: June 2, 1975

[21] Appl. No.: 582,872

[52] U.S. Cl. .................... 244/7 A; 416/161; 416/170 R
[51] Int. Cl.² ................................... B64C 27/24
[58] Field of Search ............ 244/6, 7 R, 7 A, 12 C, 244/17.11, 17.27; 416/170, 149, 161, 20, 93, 90, 92, 22, 21

[56] References Cited
UNITED STATES PATENTS

| | | | |
|---|---|---|---|
| 2,628,792 | 2/1953 | Griffith | 244/7 R |
| 3,025,022 | 3/1962 | Girard | 244/7 A |
| 3,146,970 | 9/1964 | Girard | 244/7 A |
| 3,327,969 | 6/1967 | Head | 244/7 R |
| 3,370,809 | 2/1968 | Leoni | 244/7 R |
| 3,693,910 | 9/1972 | Aldi | 244/7 A |
| 3,792,827 | 2/1974 | Girard | 244/7 A |
| 3,794,273 | 2/1974 | Girard | 244/7 A |
| 3,907,219 | 9/1975 | Pharris | 244/7 A |

FOREIGN PATENTS OR APPLICATIONS

| | | | |
|---|---|---|---|
| 966,032 | 9/1950 | France | 244/7 R |
| 1,131,494 | 2/1957 | France | 244/7 R |

Primary Examiner—Trygve M. Blix
Assistant Examiner—Galen L. Barefoot
Attorney, Agent, or Firm—Brown & Martin

[57] ABSTRACT

An aircraft having a rotor wing which in one position is locked against the airframe for forward flight, and in another position is extended clear of the airframe. In the extended position the wing is rotated and the tip portions are controllable in the manner of a helicopter rotor. A single power source provides propulsive and wing rotation power. In the preferred form the power source is a turbojet engine and the wing is rotated by a tip jet powered drive beam, separated from the wing to avoid aerodynamic interference. For forward flight the drive beam is enclosed in the airframe as the wing is retracted to fixed position.

9 Claims, 16 Drawing Figures

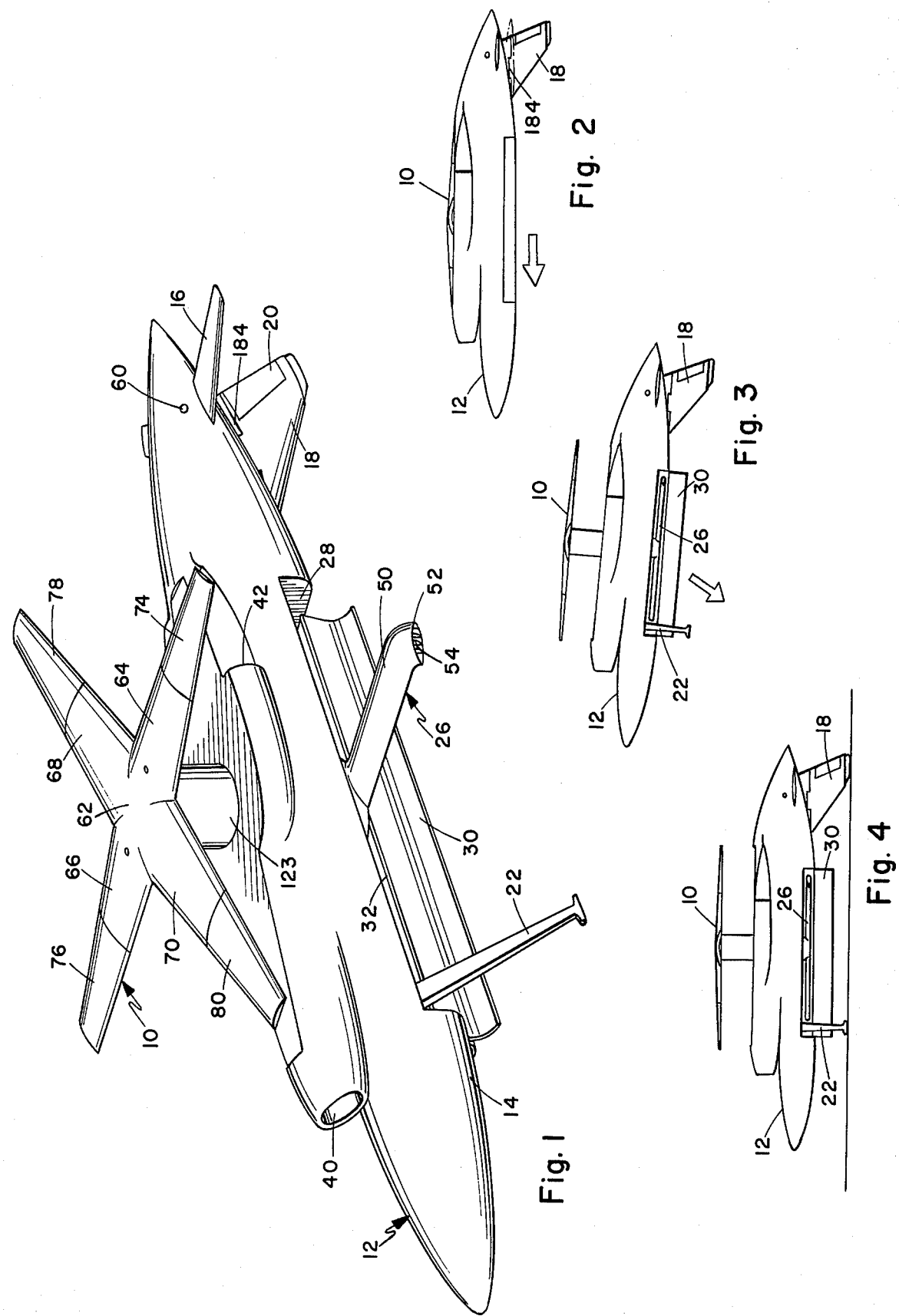

AIRCRAFT WITH RETRACTABLE ROTOR WING

BACKGROUND OF THE INVENTION

Rotary wing aircraft, such as helicopters, are very maneuverable at low speeds but have limited high speed capability. Compound aircraft with fixed and rotary wings are similarly limited unless the rotary portion can be stopped and stowed in a low drag configuration, which requires complex and heavy structure.

Rotor wing aircraft have been developed in which the wing acts as a rotor for vertical flight and becomes a fixed wing for high speed flight. A typical example is described in U.S. Pat. No. 3,159,360, entitled Jet Powered VTOL Aircraft. In this aircraft the same power source is used for forward propulsion and rotor wing drive, and a single control system operates the aircraft in both modes and through transition between the modes. To provide working clearance during the rotor phase of wing operation, the wing must be mounted on a pylon, or similar support, clear of the basic airframe. This has aerodynamic and structural disadvantages and requires some compromises in design and performance.

In the above referenced U.S. patent, the rotor wing is driven by tip jet propulsion, with propulsion gas ducted through the wing. This requires a thick airfoil section and is not practical in small aircraft. The problem is solved in one manner in U.S. Pat. No. 3,792,827, entitled VTOL Aircraft with Cruciform Rotor Wing. In this aircraft a separate tip jet powered member is mounted directly below and attached to the rotor wing. While suitable for some applications, this has aerodynamic disadvantages and still requires the wing to be mounted clear of the airframe.

SUMMARY OF THE INVENTION

The aircraft described herein has a rotor wing which is mounted on a telescopic supporting mast and can be extended and retracted as required. In the retracted position the wing rests on the basic airframe and is aerodynamically faired into the structure in a fixed position for high speed forward flight. In the extended position the wing is clear of the airframe and is rotated for powered lift, the wing tip portions being movable in the manner of a helicopter rotor. The airframe can be of any suitable configuration and is provided with conventional aerodynamic control means for forward flight control.

In a preferred form, a turbojet engine provides all power, with direct thrust for forward flight. For rotary wing drive, the jet exhaust is diverted to a rotating drive beam having tip jets for propulsion, the drive beam being mounted on the opposite side of the airframe from the wing. The separation avoids aerodynamic interference between the wing and the drive beam, and keeps the hot exhaust gases clear of the rotating wing mounting and its associated control system. The drive beam is coupled to the wing by a telescopic drive shaft within the wing supporting mast. In the fixed wing position, the drive beam is stowed longitudinally in the airframe and enclosed by doors for minimum drag.

The rotating wing has a large swept area, so that the aircraft operates efficiently at a low disc loading in vertical and low speed flight. In fixed position the wing has a small area and the aircraft operates efficiently at a high wing loading in forward high speed flight. Transition between the two modes is rapid and smooth.

The configuration is adaptable to aircraft for a variety of purposes, but is particularly suited to a small drone or RPV (remotely piloted vehicle). In a simple form the RPV could be air launched, or accelerated to forward flight speed by a catapult or launch rockets. For recovery and landing, the drive beam enclosure doors could be opened by simple release means, together with a suitable folding landing gear. At the same time the wing would be extended and powered for control in descent to a landing in a restricted area, as on board a ship. The aircraft could then be prepared for subsequent forward flight by manually resetting the components.

By adding simple two way controls to the drive beam doors and landing gear, the aircraft would be capable of full vertical take-off and landing performance, with transition to and from forward flight.

The primary object of this invention, therefore, is to provide a new and improved aircraft with a retractable rotor wing.

Another object of this invention is to provide an aircraft having a wing which is movable between a fixed retracted position for forward flight, and an extended position in which it is rotatably driven for vertical flight.

Another object of this invention is to provide a rotor wing aircraft in which the wing is rotated by a tip jet powered drive beam mounted in spaced position from the wing.

Another object of this invention is to provide a rotor wing aircraft in which the drive beam is fully enclosed when the wing is retracted for high speed flight.

A further object of this invention is to provide a retractable rotor wing structure which is particularly adaptable to small RVP type aircraft.

Other objects and advantages will be apparent in the following detailed description, taken in conjunction with the accompanying drawings, in which:

FIG. 1 is a perspective view of a typical form of the aircraft in rotary wing configuration.

FIGS. 2, 3, and 4 illustrate the transition of the aircraft from forward flight to vertical flight and landing.

DESCRIPTION OF THE PREFERRED EMBODIMENT

Figure 5:
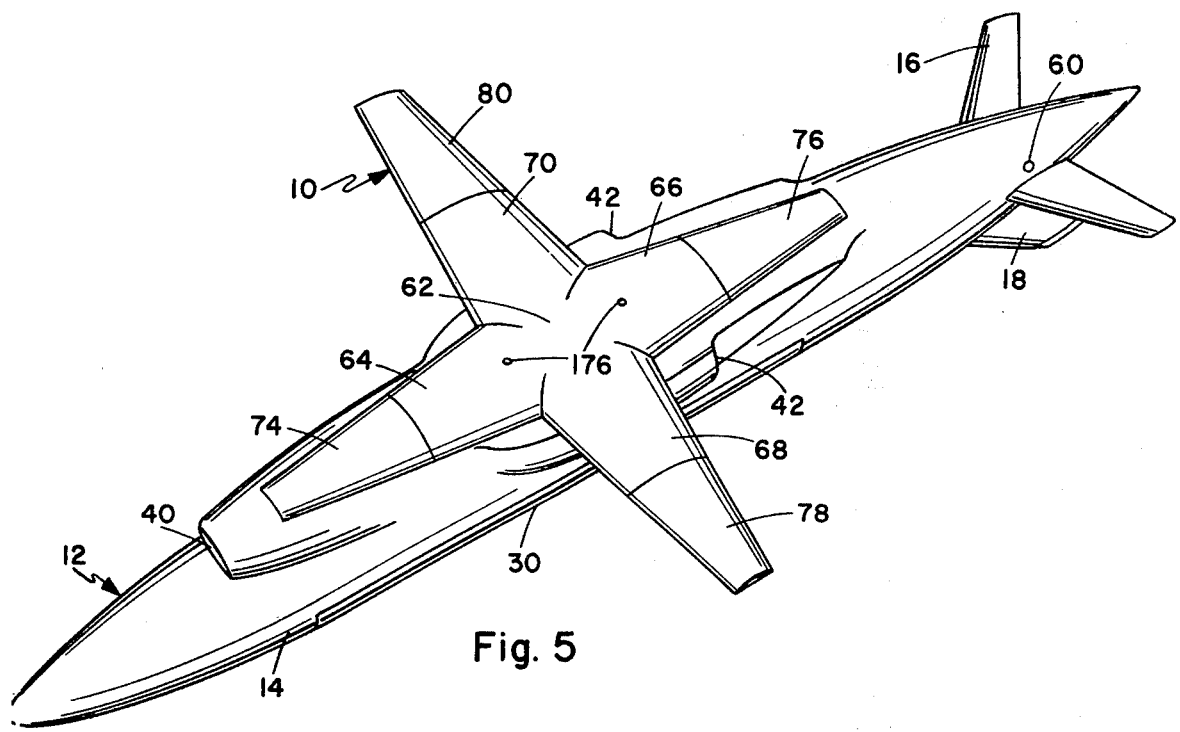
FIG. 5 is a perspective view of the aircraft in fixed wing configuration.

The aircraft illustrated in FIGS. 1–11 is an example of a remotely piloted vehicle incorporating the rotor wing system, with a cruciform type wing 10 on top of an airframe 12. The airframe comprises a suitable fuselage 14 to contain the propulsion system, controls and payload and is provided with horizontal tail surfaces 16 and a vertical fin 18, having a rudder 20. The fin is mounted below the fuselage to serve as a rear support of a tripod landing gear, the main legs 22 of which are attached to the forward portion of the fuselage.

Wing 10 is supported on a mast assembly 24 which is mounted substantially vertically in the fuselage. At the lower end of the mast assembly is a drive beam 26, which is coupled to the wing as hereinfter described. In stopped position the drive beam disposed longitudinally in a bay 28 in the lower fuselage, and is enclosed by doors 30. The doors are mounted on hinges 32 near the lower center line of the fuselage, to swing downwardly and clear the bay 28 for rotation of the drive beam 26. In the open position, indicated in broken line in FIGS. 9 and 10, the doors are below the fuselage and do not interfere with the lifting airflow from the rotating wing.

Figure 6:
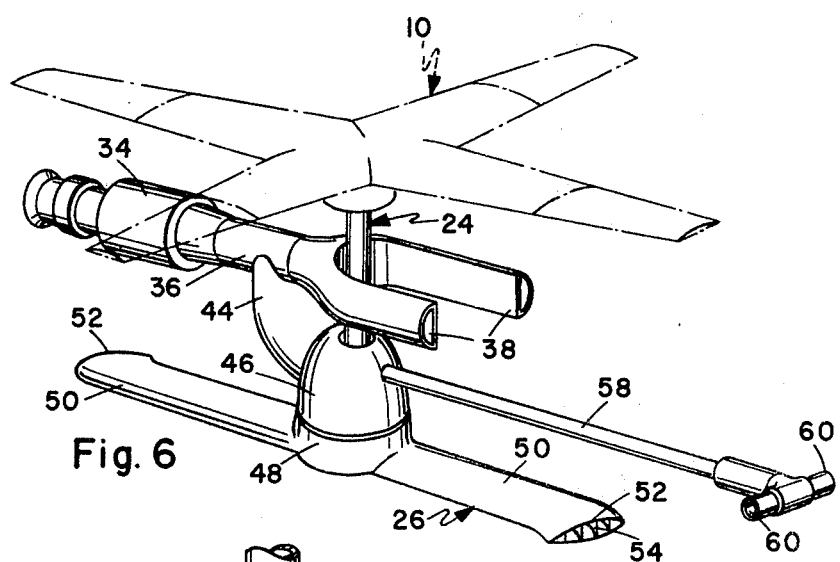
FIG. 6 illustrates the propulsion system.
Figure 7:
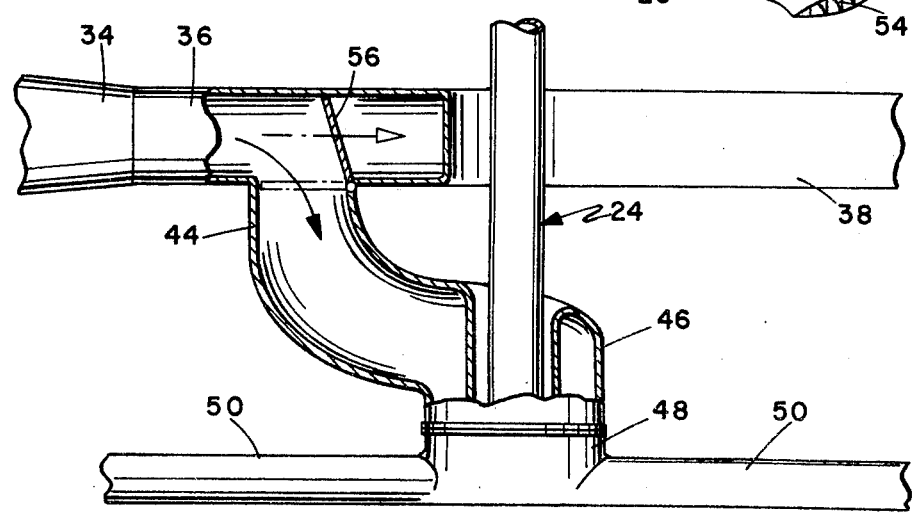
FIG. 7 is a side elevation view of a portion of the propulsion system, partially cut away to show the diverter valve arrangement.
Figure 8:
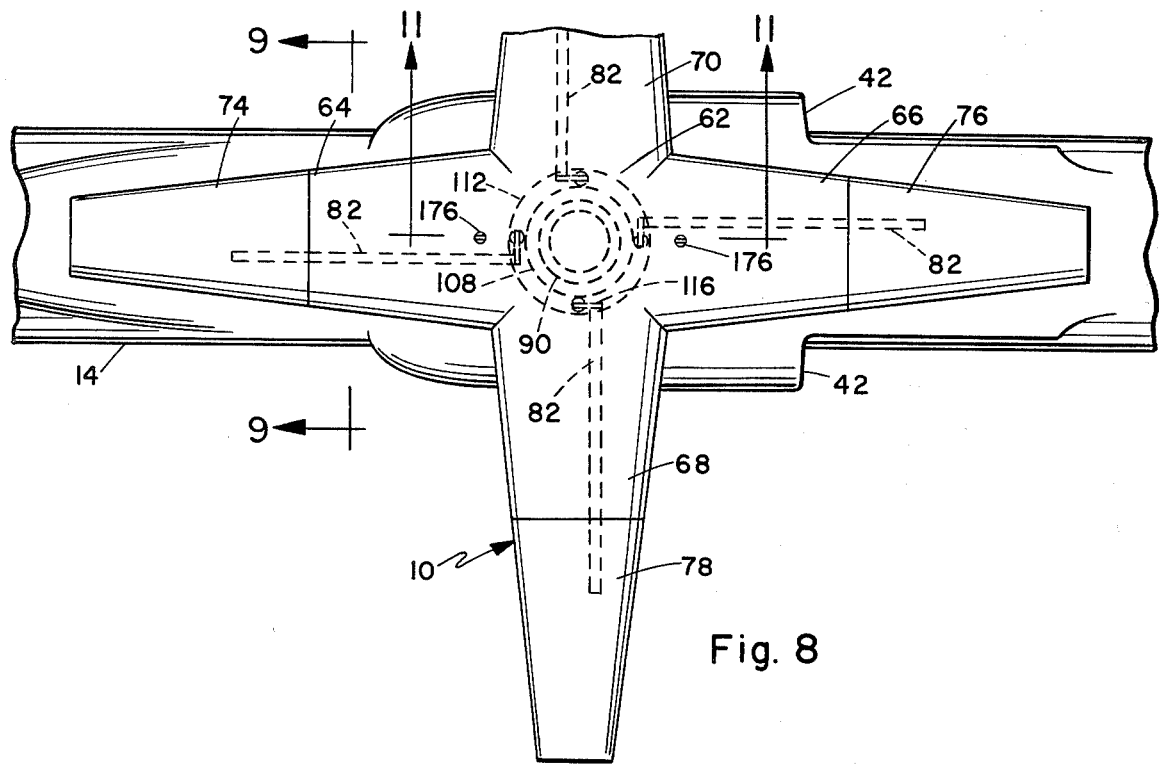
FIG. 8 is a top plan view of the cruciform wing structure.

The propulsion system, shown in FIGS. 6 and 7, includes a gas generator such as a turbojet engine 34 having an exhaust duct 36, leading to tailpipes 38 which are bifurcated to clear the mast assembly 24. The fuselage 14 has an inlet 40 for the engine 34, and rearwardly opening tailpipe outlets 42 for forward flight propulsion. A divertor duct 44 leads from exhaust duct 36 to a plenum chamber 46 surrounding the lower portion of the mast assembly. Drive beam 26 has a central hub 48 coupled to plenum chamber 46 by a rotating joint, to conduct exhaust gases into the hollow arms 50 of the drive beam. The tips of arms 50 have outlet nozzles 52 with deflectors 54 to exhaust the gases substantially tangential to the path of rotation of the nozzles. A diverter valve 56 in the exhaust duct 36 provides selective flow of gases to the tailpipes 38 or the drive beam 26. From plenum chamber 46 a bleed pipe 58 leads to a pair of directional control nozzles 60, opening to opposite sides of the fuselage 14 adjacent the rear, for directional control at very low speeds.

Wing 10 is of cruciform configuration and comprises a central portion 62, with a first pair of opposed arms 64 and 66 and a second pair of opposed arms 68 and 70 perpendicular to the first pair. All of the arms are in a common plane and have a lenticular type airfoil section to suit the particular performance range. The arms 64, 66, 68, and 70 have movable tip portions 74, 76, 78, and 80, respectively. Each tip portion is variable in pitch and is mounted on a shaft 82, which extends radially through the respective inner arm portion and is supported in suitable bearings 84. Each shaft is offset forward of the spanwise axis of the respective arm and extends into the wing central portion 62. In the stopped position, illustrated in FIGS. 5 and 8, the arms 64 and 66 are disposed longitudinally and rest on top of fuselage 14. The fuselage structure may be recessed as necessary to fair the wing smoothly into the contours. Arms 68 and 70 extend on opposite sides and provide the lift in high speed flight.

Figure 11:
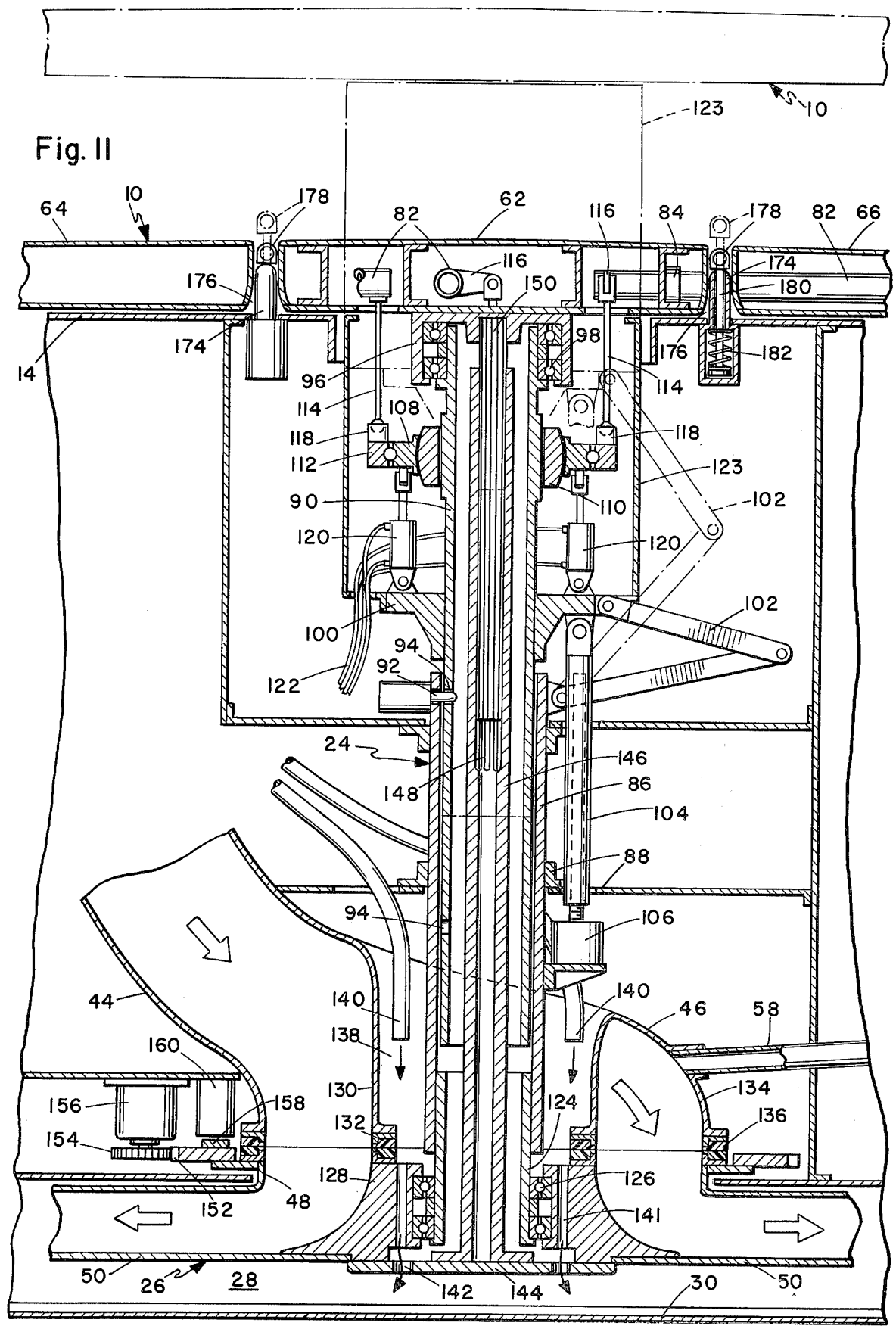
FIG. 11 is an enlarged sectional view taken on line 11—11 of FIG. 8.

Mast assembly 24, illustrated in detail in FIG. 11, includes a fixed outer mast 86 secured to the internal structure 88 in the lower portion of fuselage 14. Vertically slidable in the outer mast 86 is a telescopic mast 90, which is non-rotatable and is held at the extended and retracted positions by a detent 92 engaging spaced sockets 94 in the telescopic mast. Wing 10 has a central hub 96, which is rotatably supported on a bearing 98 on the upper end of telescopic mast 90. Fixed to the telescopic mast below the upper end is a collar 100, which carries the rotor wing control mechanism. An elbow link 102 is pivotally connected between collar 100 and outer mast 86, to allow the telescopic mast 90 to slide axially without rotating. Telescoping drive action is provided by a screw jack 104 attached to collar 100, and driven by a motor 106 mounted on outer mast 86. Other comparable actuating means, such as a rack and pinion drive, may be used if desired, to suit a specific installation.

Above collar 100 is a swash plate 108, universally pivotally mounted on a ball ring 110, which is axially slidably on telescopic mast 90. Swash plate 108 has a rotatable outer ring 112, from which connecting rods 114 extend to actuating arms 116 on the wing tip control shafts 82. Connecting rods 114 are attached to outer ring 112 by ball joints 118, to accommodate the various motions of the swash plate and linkage. The swash plate 108 is supported above collar 100 by a plurality of double acting linear actuators 120. The actuators are connected to a suitable source of power by flexible connectors 122, to allow for telescopic motion of the assembly. The various motors and actuators used in the system may be electrically or fluid pressure powered, depending on the services available in the aircraft. For protection when the mast is extended, the mechanism is preferably enclosed in a shroud 123 attached to collar 100.

The basic control system and techniques for operation of a helicopter type rotor by a swash plate mechanism are well known. Actuators 120 are operated individually to incline the swash plate and provide cyclic pitch control of the wing tip portions through the connecting rod linkages. Simultaneous operation of the actuators provides collective pitch control by sliding the swash plate assembly axially. A complete control system for accomplishing this is described in detail in the above mentioned U.S. Pat. No. 3,159,360. This system includes all the cyclic and collective pitch control mechanisms, interconnection of the rotor controls with aerodynamic control surfaces, phase control of the swash plate to provide roll control action of one or more wing tip portions in the stopped wing position, and all other functions necessary for operation of the rotor wing type aircraft. While the system is shown for use with a three armed or delta type wing, it is completely adaptable to the cruciform wing, as in U.S. Pat. No. 3,792,827, also referenced above.

Fixed in the lower end of outer mast 86 is a sleeve 124 carrying a bearing 126. Drive beam 25 has a bearing hub 128, which is rotatably supported on bearing 126. Plenum chamber 46 has an inner wall 130 to which bearing hub 128 is rotatably coupled by a carbon seal ring 132, or similar sealing means. Hub 48 is similarly connected to the outer wall 134 of plenum chamber 46 by a seal ring 136. Inner wall 130 is concentrically spaced from outer mast 86 to provide a cooling duct 138. Cooling air is blown through the duct from nozzles 140, which are connected to the compressor stage of engine 34, or to any other suitable source of cooling air. Bearing hub 128 has air passages 141 to conduct cooling air adjacent bearing 126, for protection against the hot exhaust gases passing through the drive beam. The air is vented through ports 142 in the lower cover plate 144 of the bearing hub.

Fixed to the bearing hub 128 is a drive shaft 146, extending coaxially through telescopic mast 90, the upper end of the drive shaft having internal splines 148. Axially slidable in the upper end of drive shaft 146 is a splined drive shaft extension 150, which is fixed to the wing hub 96. A telescopic drive connection is thus provided directly from the drive beam 26 to wing 10.

To stop the wing and drive beam in correct alignment with the fuselage, and to minimize wing stopping time, auxiliary drive and indexing means is used. As illustrated, a ring gear 152 is attached to drive beam hub 48 and is engaged by a pinion 154 on a motor 156, mounted in the fuselage. On the ring gear 152 is an indicator 158, such as a magnet, which is sensed by a detector 160 when the drive beam 26 is longitudinally aligned in bay 28.

When wing 10 is rotating, motor 156 may be rendered free running, or a suitable clutch may be used. To stop the wing rotation, power is applied to the motor 156 to make the motor operate as a brake for slowing the rotation. The motor then rotates the assembly at low speed until the indicator 158 is aligned with detector 160. At this position the wing can be retracted, the landing gear legs 22 retracted and the doors 30 closed.

Figure 9:
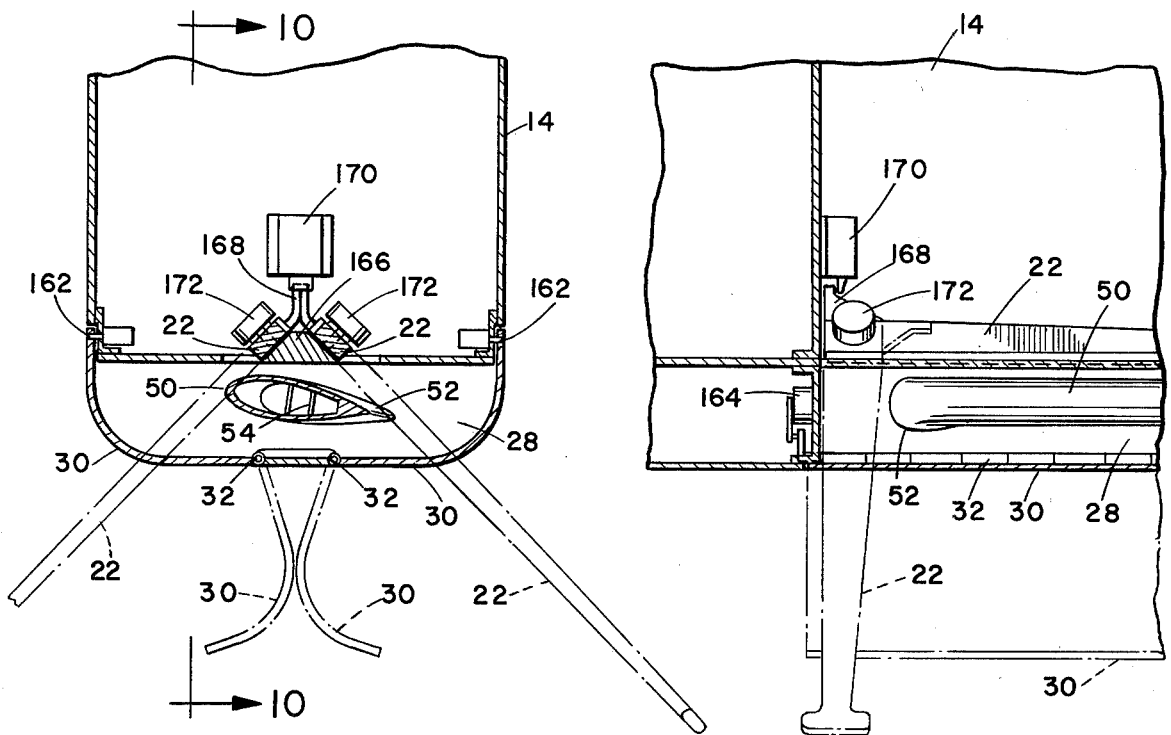
FIG. 9 is an enlarged partial sectional view taken on line 9—9 of FIG. 8.
Figure 10:
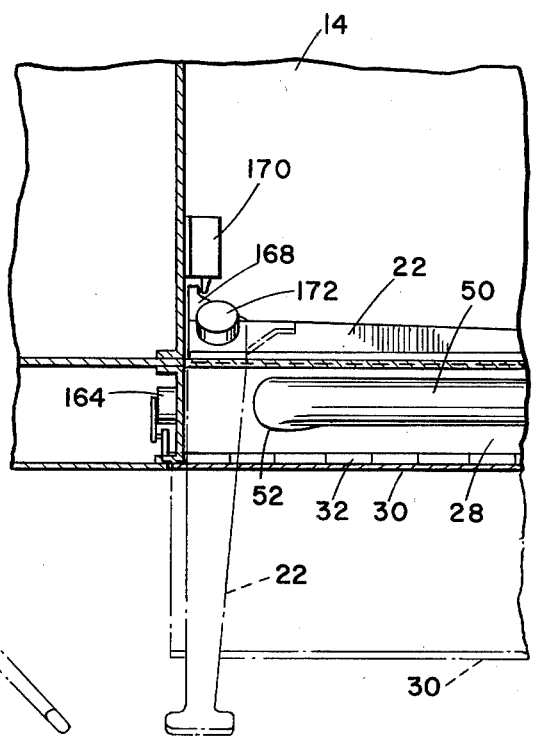
FIG. 10 is a sectional view taken on line 10—10 of FIG. 9.

As shown in FIGS. 9 and 10, doors 30 are held closed by lock pins 162 and are opened by actuators 164 at hinges 32. Landing gear legs 22 are hinged at their upper ends on support structure 166 and are provided with lugs 168, which are engaged by a latch 170 to hold the legs in up or retracted position, as in full line. Actuators 172 are attached to the legs for extension when the latch is released. in a simple RPV intended for launch in the fixed wing position, transition from vertical to forward flight is not necessary, so the doors and legs can be closed and locked manually. Actuators 164 and 172 can then be simple torsion springs, or the like, for opening the doors and legs to the positions shown in broken line, when the respective detents are released. Solenoids or similar means may be used to operate latch 170 and lock pins 162. By making actuators 164 and 174 operable in both directions, the aircraft can take off in rotary wing mode and make a transition to forward flight.

When wing 10 is retracted, the central portion 62 seats on alignment pins 174, which project from the top of fuselage 14 into open sockets 176 in the wing structure. To facilitate suspending the RPV from a carrier aircraft, a suspension eye 178 is mounted on a tie rod 180, which slides axially through each alignment pin 174. The tie rod 180 is baised downwardly by a spring 182 to retract eye 178 into the wing socket 176. To attach the RPV to a carrier aircraft, the eyes 178 are pulled up manually, as in the broken line position in FIG. 11, and secured to an existing bomb rack or other stores suspension means. To minimize ground clearance when suspended from a carrier aircraft, fin 18 may be provided with a hinge 184 to swing upwardly to one side, and released as the RPV is launched.

After completing the fixed wing portion of a flight, in the configuration shown in FIG. 2, transition to vertical flight is simple and rapid. Detent 92 is released and screw jack 104 is actuated to raise the wing. Doors 30 are opened and legs 22 extended to the configuration of FIG. 3. Diverter valve 56 is then moved to block tail pipes 38 and divert the jet exhaust to the drive beam 26, which starts to rotate and drive the wing. As the aircraft decelerates, control is accomplished in the manner of a helicopter by cyclic and collective pitch control of the wing tips and the use of control nozzles 60. U.S. Pat. No. 3,159,360 describes the gas flow control and modulation to directional control nozzles at the tail, and the system is applicable to the aircraft disclosed herein. The aircraft can be flown in to a landing on the legs 22 and fin 18, as in FIG. 4.

Conventional radio or other remote control means can be used to control all flight functions and operation of the various actuators. For some operations, automatic sequencing means may be used and an automatic pilot of stabilization system may be used for some phases of flight. The apparatus is readily available and the techniques well known.

Figure 12:
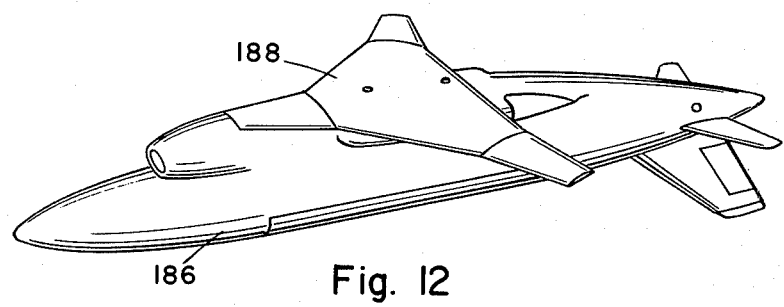
FIG. 12 is a perspective view of an aircraft with a modified delta wing.

The telescopically movable rotor wing is also adaptable to other configurations, such as the aircraft 186 with a triangular or three armed modified delta wing 188, illustrated in FIG. 12. Except for the number of wing arms, all of the above described structure and the control system are applicable. The swept back configuration of the wing in stopped position is particularly suitable for high speed flight.

Figure 13:
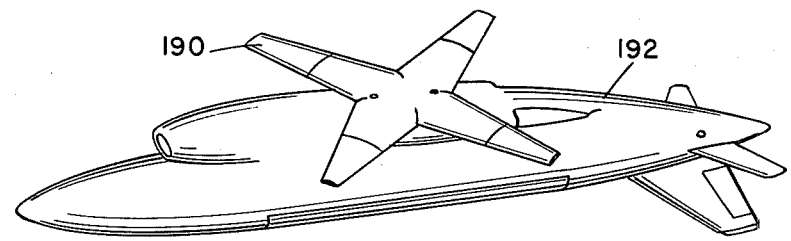
FIG. 13 is a perspective view of an aircraft with a cruciform wing stopped in oblique position.

A further arrangement, utilizing the cruciform wing, is illustrated in FIG. 13. In this configuration the wing 190 is stopped in oblique position on the aircraft 192, with two arms extending on each side. There are thus two swept forward wings and two swept back wings in tandem. The result is an increase in the critical Mach number due to the sweep back and a larger useful wing area in the fixed wing position, for use in high altitude or long range flight.

Figure 15:
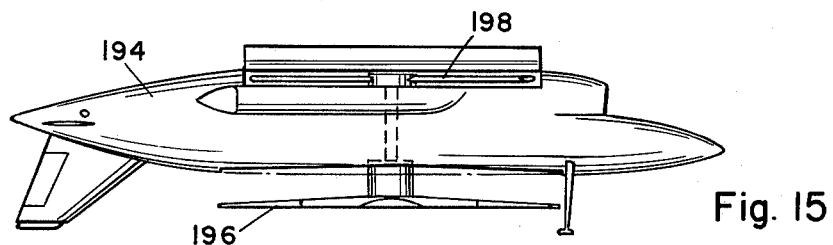
FIG. 15 is a side elevation view of an aircraft with a low mounted rotor wing and the drive beam above.

In FIG. 15, the aircraft 194 is adaptable to any of the wing configurations, but the wing 196 is on the underside rather than on top of the airframe. The drive beam 198 is positioned in the top portion of the airframe, all other structure being substantially as described above. For some uses this low wing arrangement may be suitable and allows a compact ducting system to the drive beam. It should also be noted that the drive beam need not be completely on the opposite side of the airframe from the wing, since the telescopic extension of the wing will provide separation in the rotary wing mode.

Figure 14:
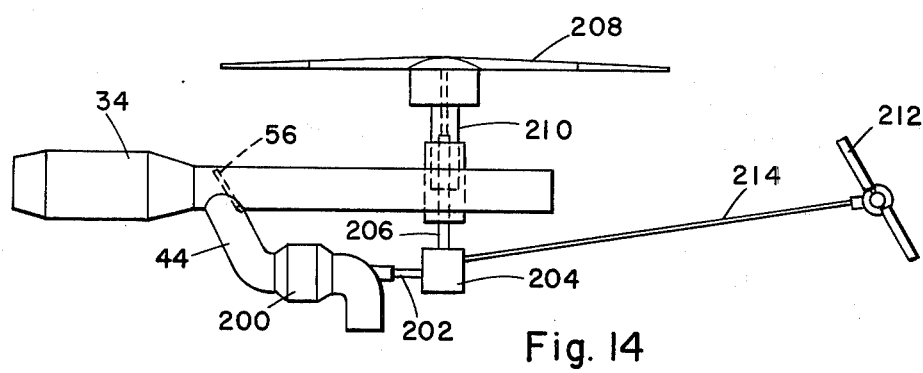
FIG. 14 illustrates an alternative gear driven propulsion system.

If the tip jet drive beam is not desirable for any reason, the telescopically mounted wing is also adaptable to the drive arrangement of FIG. 14. The turbojet engine 34, diverter duct 44 and diverter valve 56 are as described above, but the diverted gases are fed to a free turbine 200. The turbine has an output shaft 202 coupled to a gearbox 204, from which a drive shaft 206 extends to wing 208 through telescopic mast 210. Since this arrangement produces a torque between the wing and the airframe, a tail rotor 212 is required and is driven by an extension shaft 214 from gearbox 204. The system is described in detail in U.S. Pat. No. 3,146,970, entitled Heliplane, in a pylon supported wing configuration.

Figure 16:
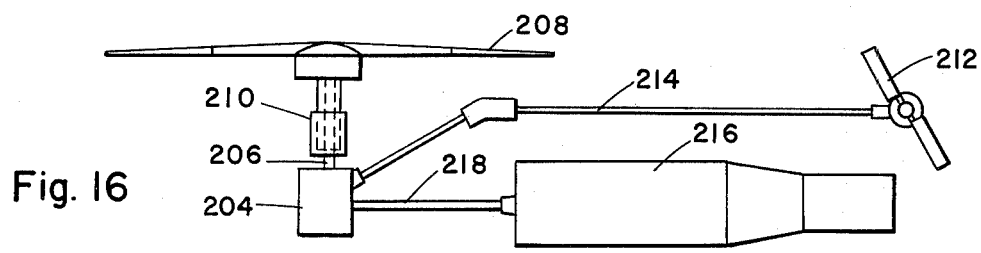
FIG. 16 illustrates an alternative shaft turbine drive arrangement.

The rotor wing is also adaptable to the drive arrangement illustrated in FIG. 16, in which a turbojet engine 216, such as a dual mode type engine, has an output shaft 218. The output shaft drives a gearbox 204 to power wing 208 and tail rotor 212, as in FIG. 14. This installation is suitable when it is necessary to install the propulsion system at the rear of the aircraft and when gas ducting would be impractical.

In any of the illustrated arrangements, the wing is stopped in a clean aerodynamic position against and integral with the basic airframe. For vertical flight the wing is extended clear of the airframe for efficient lifting air flow, with minimum aerodynamic interference with the airframe structure and the drive means, which is separated from the wing.

Having described my invention, I claim:

1. An aircraft comprising:

an airframe having a longitudinal axis, a drive shaft rotatably mounted in said airframe substantially perpendicular to the longitudinal axis, a wing attached to one end of said drive shaft, the wing having multiple extended arms of airfoil cross section, drive means coupled to said drive shaft for rotating the wing, said wing arms having variable pitch tip portions, control means coupled to said tip portions for cyclically controlling the pitch thereof during wing rotation, wing actuating means including a telescopic mast having a fixed outer portion secured in the airframe coaxial with said drive shaft, a movable mast axially slidable in said outer portion, said wing being rotatably mounted on said movable mast, an actuator connected between said outer portion and said movable mast for extension and retraction of the movable mast, stop means on the airframe for holding the wing in the retracted position with certain of said arms extending on opposite sides of the airframe, and said control means including a pitch control shaft extending from each of said wing arms, and actuators mounted on said movable mast and connected to said pitch control shafts.

2. An aircraft according to claim 1, wherein said stop means includes alignment pins projecting from the airframe toward said wing, said wing having sockets therethrough to receive said alignment pins as the wing is moved to the retracted position, each of said alignment pins having hanger means retractably mounted therein, for extension beyond the wing for engagement with aircraft supporting means.

3. An aircraft according to claim 1, wherein said drive means comprises:

a gas generator, a drive beam fixed to the other end of said drive shaft, the drive beam having opposed hollow arms and each arm having a tip nozzle directed substantially tangential to the path of rotation thereof, gas conducting means connecting said gas generator to said drive beam, said drive beam having a bearing hub rotatably mounted on the mast outer portion, and means for conducting cooling air through the bearing hub.

4. An aircraft according to claim 3, wherein said gas conducting means includes a plenum chamber concentric with and spaced from said mast outer portion, and defining an air conducting duct therebetween, said drive beam having a central portion supported on said bearing hub and rotatably coupled to said plenum chamber.

5. An aircraft according to claim 3, wherein said airframe has a longitudinally extending bay in which said drive beam is contained in the stopped position of the wing, and hinged doors mounted on the airframe for enclosing said bay.

6. An aircraft according to claim 5, wherein said doors are hinged to swing open together substantially along the center line of the airframe and clear of the airflow from the rotating wing.

7. An aircraft according to claim 3, wherein said airframe has a longitudinally extending bay in the lower portion thereof, in which said drive beam is contained in the stopped position of the wing;

and doors hinged on the airframe for enclosing said bay.

8. An aircraft according to claim 7, wherein said doors are hinged below the airframe adjacent the center line thereof, to swing downwardly below the airframe;

and landing gear retractably mounted in said bay.

9. An aircraft according to claim 8, and including retaining means holding said doors closed and said landing gear retracted, and actuating means for opening the doors and extending the landing gear when the retaining means are released.

* * * * *